US012221578B2

(12) United States Patent
Zhang et al.

(10) Patent No.: US 12,221,578 B2
(45) Date of Patent: Feb. 11, 2025

(54) METHODS FOR COMPLETING A WELLBORE USING HIGH DENSITY BRINE CONTAINING COLLOIDAL PARTICLES

(71) Applicant: Schlumberger Technology Corporation, Sugar Land, TX (US)

(72) Inventors: Hui Zhang, Sugar Land, TX (US); Xia Wei, Houston, TX (US); Brandi Katherine Price Hoelscher, Houston, TX (US); Steven Young, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/045,999

(22) Filed: Oct. 12, 2022

(65) Prior Publication Data

US 2023/0072927 A1    Mar. 9, 2023

Related U.S. Application Data

(62) Division of application No. 15/578,652, filed as application No. PCT/US2016/034758 on May 27, 2016, now abandoned.

(60) Provisional application No. 62/168,805, filed on May 30, 2015.

(51) Int. Cl.
| | |
|---|---|
| *C09K 8/05* | (2006.01) |
| *C09K 8/04* | (2006.01) |
| *C09K 8/36* | (2006.01) |
| *C09K 8/504* | (2006.01) |
| *C09K 8/84* | (2006.01) |
| *C09K 8/92* | (2006.01) |

(52) U.S. Cl.
CPC ............. *C09K 8/05* (2013.01); *C09K 8/04* (2013.01); *C09K 8/36* (2013.01); *C09K 8/5045* (2013.01); *C09K 8/845* (2013.01); *C09K 8/92* (2013.01); *C09K 2208/10* (2013.01)

(58) Field of Classification Search
CPC ........ C09K 8/05; C09K 8/16; C09K 2208/10; Y10S 507/906
See application file for complete search history.

(56) References Cited

U.S. PATENT DOCUMENTS

| 4,465,061 A | 8/1984 | McMurtrie |
| 4,566,976 A | 1/1986 | House et al. |
| 4,792,412 A | 12/1988 | Heilweil |
| 4,825,950 A | 5/1989 | Kalpakci et al. |
| 7,892,352 B2 | 2/2011 | Roddy et al. |
| 8,822,386 B2 | 9/2014 | Quintero et al. |
| 9,040,466 B2 | 5/2015 | Deville |
| 2005/0107265 A1* | 5/2005 | Sullivan .............. C09K 8/845 507/271 |
| 2006/0096757 A1* | 5/2006 | Berry .................. C09K 8/52 166/308.4 |
| 2006/0127301 A1 | 6/2006 | Elitzur et al. |
| 2006/0151171 A1 | 7/2006 | Davies et al. |
| 2008/0078545 A1 | 4/2008 | Welton et al. |
| 2011/0162845 A1 | 7/2011 | Ravi et al. |
| 2011/0177986 A1 | 7/2011 | Walker |
| 2012/0211227 A1* | 8/2012 | Thaemlitz ........... C09K 8/516 977/773 |
| 2014/0144633 A1 | 5/2014 | Nguyen et al. |
| 2014/0158354 A1 | 6/2014 | Kumar et al. |
| 2016/0017204 A1 | 1/2016 | Hill et al. |
| 2017/0088762 A1 | 3/2017 | Zhang et al. |

FOREIGN PATENT DOCUMENTS

| RU | 2659046 C1 | 6/2018 |
| WO | 2014085770 A1 | 6/2014 |

OTHER PUBLICATIONS

The geological history of seawater, Halvey, et al., Science, 355, 2017, p. 1069-1071 (Year: 2017).*
Examination Report dated May 11, 2018, issued in corresponding British Application No. GB1616584.7 (3 pages).
Cabot "Formate Technical Manual" Section A5, Crystallization Temperature, pp. 1-20, Jun. 2015 (Cabot).
Search and Examination Report issued in British Application No. 881616584.7 dated Mar. 14, 2017 (6 pages).
Communication pursuant to Article 94(3) for the equivalent European patent application 16804144.0 mailed on Oct. 17, 2019.
Intenational Search Report and Written Opinion for the equivalent International patent application PCT/US2016/34758 mailed on Aug. 24, 2016.
International Preliminary Report on Patentabiliby for the equivalent International patent application PCT/US2016/34758 mailed on May 16, 2017.
Extended Search Report for the equivalent European patent application 16804144.0 mailed on Nov. 22, 2018.
Office Action issued in U. S. U.S. Appl. No. 17/450,900 dated Aug. 4, 2022, 13 pages.
Office Action issued in Mexican Patent Application No. MX/a/2017/015414 dated Oct. 14, 2022, 14 pages with English translation.
Testing of Heavy Brines, API Recommended Best Practice 13J, Sixth Edition, Jan. 2023, 91 pages.

* cited by examiner

*Primary Examiner* — Aiqun Li
(74) *Attorney, Agent, or Firm* — Garry Brown, Jr.

(57) ABSTRACT

A wellbore fluid comprising an aqueous base fluid and a plurality of nanoparticles suspended in the aqueous base fluid. The nanoparticles are present in the wellbore fluid in an amount effective to have an effect of increasing the density by at least 0.2 lb/gal.

17 Claims, No Drawings

METHODS FOR COMPLETING A WELLBORE USING HIGH DENSITY BRINE CONTAINING COLLOIDAL PARTICLES

CROSS-REFERENCE TO RELATED APPLICATIONS

This application is a Divisional of U.S. patent application Ser. No. 15/578,652, filed on May 27, 2016, which is herein incorporated by reference in its entirety.

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize penetration rate.

Once drilling operations have been completed, the well is prepared for the completion operations whereby the mud used for drilling is often displaced by a completion fluid. There are numerous methods of completing a well, amongst which are open-hole completions, pre-drilled, liner, and gravel packed screened systems. Completion fluids broadly refer to any fluid pumped down a well after drilling operations have been completed, including fluids introduced during acidizing, perforating, fracturing, workover operations, etc. A drill-in fluid is a specific type of drilling fluid that is designed to drill and complete the reservoir section of a well in an open hole, i.e., the "producing" part of the formation. In particular, it is desirable to protect the formation from damage and fluid loss, and not impede future production. Most drill-in fluids contain several solid materials including viscosifiers, drill solids, and additives used as bridging agents to prevent lost circulation and a barite weighting material to control pressure formation.

Completion fluids are typically water-based clear fluids and are formulated to the same density as or slightly greater density than the mud used to drill the well in order to retain the hydraulic pressure on the well bore. The clear fluids are typically halide based brines or organic based brines such as the formate-based fluids. There are occasions when a completion fluid with density up to 19.0 lbm/gal is desired. Currently, there are two conventional choices commercially available in the oil industry that allow to reach such a density—zinc bromide and cesium formate. Each of these two candidates has limitations. For example, zinc bromide is a priority pollutant and, as a result, cannot be used in some applications. Because cesium is rare, the cost and availability of cesium formate are often prohibitive.

Upon completion of drilling, a filter cake and/or fluid loss pill may stabilize the wellbore during subsequent completion operations such as placement of a gravel pack in the wellbore. Additionally, during completion operations, when fluid loss is suspected, a fluid loss pill of natural polymers and/or bridging agents may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes an aqueous base fluid and a plurality of nanoparticles suspended in the aqueous base fluid, wherein the nanoparticles are present in the wellbore fluid in an amount effective to have an effect of increasing the density by at least 0.2 lb/gal.

In another aspect, embodiments of the present disclosure relate to a method for completing a wellbore that includes pumping a wellbore fluid into the wellbore, the wellbore fluid including an aqueous base fluid and a plurality of nanoparticles suspended in the aqueous base fluid, and performing at least one completion operation while the wellbore fluid is in the wellbore.

In another aspect, embodiments of the present disclosure relate to a method, which includes introducing a wellbore fluid into a wellbore, the wellbore fluid having a turbidity ranging from about 10 to about 300 nephelometric turbidity units.

DETAILED DESCRIPTION

Generally, embodiments disclosed herein relate to high density wellbore fluids and methods of using the same. More specifically, embodiments disclosed herein relate to wellbore fluids for downhole applications formed of an aqueous base fluid and a plurality of colloidal particles such as nanoparticles suspended in the aqueous base fluid, wherein the nanoparticles are present in the wellbore fluid in an amount effective to have an effect of increasing the density of the wellbore fluid. The inventors of the present disclosure have found that nanoparticles of specific size and in sufficient quantity suspended in an aqueous base fluid may be used for the preparation of wellbore fluids that exhibit high density and a low true crystallization temperature (TCT) of the brine.

The wellbore fluids of the present disclosure incorporate a plurality of colloidal particles that can be dispersed or suspended in a base fluid. The colloidal particles that have shown utility in the present disclosure are selected from the group of nanoparticles. As defined herein, nanoparticles are defined as having at least one dimension of less than 1 micron. The nanoparticles of the present disclosure do not increase the viscosity of the wellbore fluid, as compared to wellbore fluids containing the same type of particles, but of larger size. Rather, the nanoparticles act as densification agents that increase the density of the fluid into which they are dispersed or suspended. For example, according to various embodiments, nanoparticles are added in a wellbore fluid to have an effect of increasing the density of the wellbore fluid by at least 0.2 lb/gal (or at least 0.5 ppg, 1.0 ppg, 3 ppg, or 6 ppg in other embodiments) without substantially increasing the plastic viscosity (PV) of the fluid and/or without substantial solid sagging (settling). In contrast, regular solids such as $CaCO_3$/barite that may be used in wellbore fluids increase mud density and PV and settle without stirring. As it will be described later in more detail, the wellbore fluids as described herein may exhibit a Newtonian low viscosity. According to various embodiments, wellbore fluids as described herein may have an apparent kinetic viscosity at room temperature that ranges from about 5 cP to about 150 cP, where the lower limit can be any of 5 cP, 10 cP, 15 cP or 20 cP and the upper limit can be any of 120 cP, 130 cP, 140 cP or 150 cP, where any lower limit can be used with any upper limit.

According to the present embodiments, the nanoparticles as described herein may also act as brine crystallization temperature agents reducing the TCT by at least 5° F. Thus, the nanoparticles may be present in the wellbore fluid in an amount that ranges from 4 wt % to 60 wt % of the total weight of the wellbore fluid, where the lower limit can be any of 4 wt %, 10 wt %, 15 wt %, 20 wt %, or 25 wt % and the upper limit can be any of 35 wt %, 40 wt %, 45 wt %, 50 wt %, 55 wt %, or 60 wt % where any lower limit can be used with any upper limit.

The resulting density of the completion fluid is a function of the quantity of the nanoparticles. Furthermore, due to their small size, nanoparticles do not damage or plug the producing formation and thus may be present in the production interval during completion operations. The wellbore fluids incorporating the nanoparticles of the present disclosure are stable and meet the desired rheology and filtration properties for application in completion operations such as completion brines, fluid loss pills, drilling fluids, or as gravel packing fluids.

As described herein, the term completion fluid refers to fluids present in the wellbore and/or used during a wellbore operation to complete a well. A completion brine is a high density fluid which is substantially free of solids and may be used as a completion fluid in the wellbore or may be used as a base to which other additives may be added for specific completion purposes (such as gravel packing, fluid loss pills or drilling fluids). While a completion brine is conventionally solids free, the present fluid may still be used, because of the small size of the nanoparticles incorporated therein. Their presence may be tolerated in certain proportions while still imparting an improvement in the density of the wellbore fluid and in lowering the freezing temperature of the wellbore fluid.

As noted above, the nanoparticles may be added with the purpose of increasing the density of the fluid into which they are dispersed or suspended. The nanoparticles used for the formulation of wellbore fluids of the present disclosure may exhibit the following properties: a) do not or minimally interact with the base fluid and other components of the wellbore fluid; b) form a stable dispersion; and c) do not settle.

According to various embodiments, the nanoparticles of the present disclosure may be coated or uncoated. As used herein, the term coated refers to any chemical or physical modification applied to the surface of the nanoparticles with the purpose of improving the dispersibility and/or the suspendability of the nanoparticles, as well as to modify their physical and/or chemical properties. Thus, for example, in the context of silica nanoparticles, the particles may have a hydrous oxide (such as alumina) or silane coating provided thereon, or optionally in combination with an overlay reacted upon the base coating. As noted above, the addition of nanoparticles to a wellbore fluid results in a high density wellbore fluid.

The nanoparticles that have shown utility in the wellbore fluids of the present disclosure are selected from the group of silica, iron carbonate, iron oxide, titanium oxide, tungsten oxide, zirconium oxide, zirconium silicate nanoparticles which may be suspended or dispersed in an aqueous base fluid. In embodiments where silica nanoparticles are used, such nanoparticles may be provided as colloidal silica nanoparticles. In such embodiments, the amount of pure silica contained in the colloidal silica products may range from 5 wt % to 50 wt %, where the lower limit can be any of 5 wt %, 10 wt %, 15 wt %, or 20 wt % and the upper limit can be any of 35 wt %, 40 wt %, 45 wt %, or 50 wt % where any lower limit can be used with any upper limit. One example of such a solution is available commercially from NYACOL NANO TECHNOLOGIES (Ashland, MA) under the name of DP9717. DP9717 contains pure $SiO_2$ in water mixed with a small amount of sodium ions ranging from about 100 to about 400 ppm. The sodium ions bond to the silica matrix and do not diffuse out to a certain degree. Such a silica product is stable in a pH range from 2.5 to 10.5. In various embodiments, the silica nanoparticles may be provided as a solution of nano-sized precipitated silica which is formed from a controlled neutralization of sodium silicate with the formation of a nano-sized solid material that can be concentrated in the solution. Such solid suspensions, depending on the method of manufacture, can be closer to neutral pH, and can be engineered to be very stable in high hardness solutions.

The size of the nanoparticles used for the formulation of the wellbore fluid may prevent or reduce the particles from sagging or settling. In addition, the size of the nanoparticles may determine the optical properties of the fluid. For example, it is well known that small particles are very efficient at scattering shorter light wavelengths.

Light scattering and absorption of light are major physical processes that contribute to the visible appearance of most objects or media. Surfaces or media described as white owe their appearance to multiple scattering of light by internal or surface inhomogeneities in the media or object. Spectral absorption, defined as the selective absorption of certain light wavelengths, determines the color of most objects, with some modification by elastic scattering. Light scattering which can also create color without absorption, often shades of blue, as with the sky, for example, can be classified as Rayleigh and Mie scattering.

According to the Rayleigh light scatter equation, the scattering intensity, I, by a particle is described by equation (1), $$I = I_0 \cdot [(1+\cos^2 \theta)/2R^2] \cdot [2\pi/\lambda]^4 \cdot [(n^2-1)/(n^2+2)]^2 \cdot (d/2)^6 \quad (1)$$

where R represents the distance to the particle, $\theta$ is the scattering angle, n is the refractive index of the particle, d is the diameter of the particle, $\lambda$, is the wavelength of the incident light, and $I_0$ is the intensity of the incident light. There are numerous factors that contribute to the scattering intensity, such as the distance to the particle, the scattering angle, and the refractive index of the particle. However, the present disclosure is concerned with the particle size, as nanoparticles scattering is highly dependent on wavelength with shorter wavelengths such as ultraviolet or blue light, which are scattered much more intensely than longer wavelengths (red light). According to embodiments of the present disclosure, the wellbore fluids as described herein may have a clear appearance, or a semi-transparent appearance, and may also have a light blue hazy look. As described herein, the term appearance is a qualitative description of the wellbore formulation. In one or more embodiments, the size of the nanoparticles is selected in such a manner that the wellbore fluid does not scatter light above 400 nm. In various embodiments, the nanoparticles may have an average size of less than 1 micron, 0.75 microns, 0.5 microns, or 0.4 microns. According to various embodiments, wellbore fluids formulated as described herein may be filtered using filter paper with pore size less than 1 micron in order to remove larger particles that may have a deleterious effect on the wellbore operation, but wherein such a filtration process preserves the presence of the nanoparticles with the desired size in the fluid formulation. By using such nanoparticles, the scattering of the light by the wellbore fluid at lower wavelengths is avoided or reduced.

As used herein, turbidity (or haze) is the cloudiness or haziness of a wellbore fluid caused by colloidal particles (such as nanoparticles) and other contributing factors that may be generally invisible to the naked eye. As described herein, "clear and colorless" with respect to a brine or a completion fluid means that the fluid has an "NTU" (nephelometric turbidity unit) less than about 20. For example, a pure $CaBr_2$ brine (when is filtered and clean) has an NTU less than 20. NTU is an American Petroleum Institute accepted unit related to the suspended solids in a brine (higher NTU=more suspended solids), based on how much light is scattered by a sample. The procedure for determining NTU is described in API RP 13J and is a procedure well known to those of ordinary skill in the art. According to the present embodiments, the turbidity of wellbore fluids of the present disclosure may range from about 10 to about 300 NTU, where the lower limit can be any of 10 NTU, 15 NTU, 20 NTU, 25 NTU, and 50 NTU and the upper limit can be any of 50 NTU, 100 NTU, 200 NTU, 250 NTU, 280 NTU or 300 NTU where any lower limit can be used with any upper limit.

The aqueous base fluid of the present disclosure may generally be any water based fluid phase. In one or more embodiments, the aqueous base fluid forms the continuous phase of the fluid and may be selected from: fresh water, sea water, brines, mixtures of water or brine and water soluble organic compounds and mixtures thereof. In those embodiments of the disclosure where the aqueous medium is a brine, the brine is water comprising an inorganic salt or organic salt. The salt may serve to provide a portion of the fluid's density (to balance against the formation pressures), and may also reduce the effect of the water based fluid on hydratable clays and shales encountered during completion. In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, nitrates, oxides, sulfates, silicates, phosphates and fluorides. Salts that may be incorporated in a brine include any one or more of those present in natural seawater or any other organic or inorganic dissolved salts. The brines that have shown utility in the wellbore fluids of this disclosure are halide brines and formate brines. According to embodiments of the present disclosure, the halide brines may be selected from the group of alkali metal halides and/or and alkaline earth metal halides. Thus, in one or more embodiments, the wellbore fluid is zinc free for environmental benefit and cesium free for cost benefit. In one or more embodiments, the halide brines are calcium chloride or calcium bromide. Sodium bromide, sodium chloride, potassium chloride, or potassium bromide may also be used. According to the present embodiments, brines (to which the nanoparticles are added) may be formulated with a salt density typically in a range from about 8.5 to about 15.1 lb/gal depending on the particular use and specific conditions.

A first characteristic of a wellbore fluid is the density of the fluid. Moreover, as the brine may contain one or more salts dissolved in a base fluid, the crystallization temperature of the brine is another parameter to be considered. For example, it is well known that the use of brines for low temperature applications in cold climates and/or deep wells presents a problem of brine crystallization. At temperatures at or below the crystallization temperature of the brine, the precipitation of crystallizing solids (e.g., salts) can change the density of the brine fluid through the wellbore column and as a result, deteriorate the ability of the fluid to maintain pressure control. Further crystallization may also lead to crystallized solids plugging the subterranean well. For example, $CaBr_2$ is a brine useful to formulate wellbore fluids with a density ranging up to 15.3 lb/gal, but from 14.5 lb/gal to above, its true crystallization temperature (TCT) and the PCT (crystallization under pressure) are too high for deep water applications.

The crystallization temperature of a brine is commonly measured in accordance to a standardized test method described in ANSI/APS Recommended Practice 13J. To characterize the crystallization profile of the brine, as described in API Recommended Practice 13J, an apparatus is used to alternately cool and heat a sample of brine fluid for measuring three different crystallization temperatures. During testing, the sample is slowly and continuously cooled until a temperature is reached at which visible crystals start to form in the sample and the temperature is recorded as the First Crystal to Appear (FCTA) temperature. During cooling, the FCTA temperature corresponds to a minimum inflection point in a plot of temperature versus time, the minimum inflection point being generally the result of a super-cooling effect. Upon reaching the FCTA temperature, the cooling temperature is held constant while the exothermic brine crystallization process proceeds. Heat is released during the brine crystallization process and the maximum temperature, or maximum inflection point, reached immediately following the FCTA temperature is recorded as the True Crystallization Temperature (TCT). The TCT corresponds to the actual true crystallization temperature of the brine. In one or more embodiments of the disclosure, the silica nanoparticles may reduce the TCT of the brine by 5° to 35° F.

One of the optional components of the wellbore fluids of this disclosure is a polymeric crystallization temperature agent which can be added to the mixture of aqueous base fluid and nanoparticles in order to regulate the true crystallization temperature (TCT) of the brine. Such a polymer may be fully dispersible in the halide brine. To control the formation of the foam formed upon mixing the polymer with the brine, a silicone defoamer may be added to the formulation. The polymers that have shown utility in the completion fluids of this disclosure are selected from the group of pyrrolidones based polymers. In one or more embodiments, the polymeric crystallization temperature agent is polyvinylpyrrolidone (PVP). The role of the crystallization temperature agent is to lower the true crystallization temperature (TCT), especially the crystallization temperature of the brine under pressure (PCT). Furthermore, it was found by the inventors of the present disclosure that the combination of such a polymeric crystallization temperature agent with a plurality of nanoparticles as described herein, has a synergetic effect increasing the density of the wellbore fluid, as well as lowering the TCT of the brine. For example, wellbore fluids formulated with such components exhibit high density and a low TCT. According to various embodiments, the amount of PVP added to the wellbore fluid may range from 0.5 to 1.5 v %.

Upon mixing, the fluids of the present embodiments may be used in wellbore operations, such as base brines in drilling fluids and fluid loss treatment (when the fluids as described herein may further include a gelling agent and a plurality of salt or mineral particulates), gravel packing operations when gravel may be used, or completion operations. It is also envisioned that the wellbore fluids as described herein may be used as an internal phase of an invert emulsion drilling fluid, or an invert emulsion gravel packing carrier fluid which may further include gravel. Such operations are known to persons skilled in the art and involve pumping a wellbore fluid into a wellbore through an earthen formation and performing at least one wellbore operation while the wellbore fluid is in the wellbore.

One embodiment of the present disclosure involves a method for completing a wellbore. In one such an illustrative embodiment, the method involves pumping an aqueous wellbore fluid into a wellbore and performing at least one completion operation while the wellbore fluid is in the wellbore. Such a wellbore fluid includes an aqueous base fluid and a plurality of nanoparticles suspended in the aqueous base fluid. In an embodiment of the present disclosure, the wellbore fluid is prepared by mixing a plurality of nanoparticles with an aqueous base fluid (such as a brine) at a pH ranging from about 2 to about 10, with the formation of a premix fluid. In yet other embodiments, the lower limit of the pH may be any of 2.5, 3 or 3.5, and the upper limit can be any of, 8, 8.5, or 9, where any lower limit can be used with any upper limit. The water may be removed from the premix fluid to form the wellbore fluid with a desired density. In such embodiments, the water may be removed by heating the premix or by mixing the premix fluid with dry salts with the formation of the wellbore fluid with a desired density. In various embodiments, the dry salts may be the same as the halides used for the preparation of the brine. In one or more embodiments, other salts may be used.

In various embodiments, the brines are formulated in such a manner that the density of the resulted wellbore fluids ranges from 11 ppg to 18 ppg, where the lower limit can be any of 11 ppg, 12 ppg, 13 ppg or 14 ppg, and the upper limit can be any of 15 ppg, 16 ppg, 17 ppg, or 18 ppg, where any lower limit can be used with any upper limit.

In one or more embodiments, the fluids formulated according to this disclosure may be used as fluid loss pills when fluid loss to the formation is experienced during a completion operation. In one embodiment, the fluid loss pill may be prepared using high density base brines as described herein. The brine may be pre-saturated with a selected salt or mineral particulates thereby rendering any further salt or particulates as substantially insoluble in the pre-saturated base brine. In yet another embodiment, when the wellbore fluid is a fluid loss pill, the fluid may further include a gelling agent which can be added to the formulation in a concentration as rheologically and functionally determined by wellbore conditions. Suitable gelling agents or viscosifiers further include various organic and/or inorganic polymeric species including polymer viscosifiers, especially metal-crosslinked polymers. Suitable polymers for making the metal-crosslinked polymer viscosifiers include, for example, polysaccharides e.g., substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents which include boron, titanium, zirconium and/or aluminum complexes are used to increase the effective molecular weight of the polymer and make them better suited for use as viscosity increasing agents, especially in high-temperature wells.

Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In embodiments disclosed herein, cellulose derivatives are used, including hydroxyethylcellulose (HEC), hydroxypropylcellulose (HPC), carboxymethylhydroxyethylcellulose (CMHEC), and/or carboxymethylcellulose (CMC), with or without crosslinkers. Xanthan, diutan, and scleroglucan are also used.

In addition to cross-linked polymers, linear polymer systems may be used. Boron crosslinked polymers systems may be used including guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium cross-linked polymer systems include polymers crosslinked with zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid.

To prevent fluid loss during well treatment, solid bridging materials may be used. Bridging materials may be insoluble, sparingly soluble, or slowly soluble in the well-bore fluid. Bridging materials may also have a particular shape and hardness such that they may be malleable, and/or round to non-spherical. Bridging materials may include various organic and inorganic salts, oxides, and the like in various insoluble physical forms, whether crystalline or amorphous, including powder, granules, beads, paste, fibers, and/or the like. These fluid loss additives are subsequently incorporated as filter cake components upon dehydration of the fluid loss pill when a differential pressure is applied on a porous medium. The bridging solid particles of the present disclosure may include inorganic compounds, such as salts and/or oxides. In one or more embodiments, the bridging solids may be carbonates such as calcium carbonates, barium carbonates, and the like.

The bridging solid particles may have an average size of about 0.5 to about 5,000 micrometers (μm) as determined according to methods known in the art. Within this range, the average size of the bridging solid particles may be greater than or equal to about 1 μm, greater than or equal to about 10 μm, or greater than or equal to about 100 μm. Also within this range, the average size of the bridging solid particles may be less than or equal to about 2,000 μm, less than or equal to about 1,000 μm, or less than or equal to about 500 μm. The bridging solid particles may be present within the fluid loss pill at about 1 wt %, to about 90 wt %, based on the total weight of the fluid loss pill. Within this range, the concentration of the bridging solid particles may be greater than or equal to about 10 wt %, greater than or equal to about 20 wt %, or greater than or equal to about 30 wt %. Also within this range, the concentration of the bridging solid particles may be less than or equal to about 80 wt %, less than or equal to about 70 wt %, or less than or equal to about 60 wt %.

The following examples are presented to further illustrate the preparation and properties of the wellbore fluids of the present disclosure and should not be construed to limit the scope of the disclosure, unless otherwise expressly indicated in the appended claims.

The wellbore fluids of the present disclosure, which are prepared using aqueous base fluids and nanoparticles, exhibit stability and wellbore performance, as well as high density and a low TCT.

EXAMPLES

Two wellbore fluid formulations, DPA and DPB, respectively, were prepared using colloidal silica and $CaBr_2$ brine. For example, the DPA and DPB were prepared by using 14.2 ppg $CaBr_2$, which was weighed up to 15 ppg and 14.8 ppg, respectively, by using colloidal silica having a D50 of approximately 50 nm. A series of tests were conducted to evaluate these two formulations.

For a basic evaluation, the density of the samples was measured by using a syringe. The results were verified by using a densitometer. The pH was detected by means of a hydrometer, while TCT was measured in accordance to the standardized test method described in API Practice 13J. PCT was measured using a similar method to the one used for TCT, but the measurements were performed under a pressure of 15,000 psi. The solution of 14.2 lb/gal $CaBr_2$ has the TCT around −1° F. and the PCT around 22° F. DPA and DPB exhibit much lower TCT and PCT values than the $CaBr_2$ brine. This demonstrates that the silica nanoparticles present in the fluid increase the brine density while lowering the brine crystallization temperature.

TABLE 1

Density, pH and TCT of DPA and DPB

| Sample | Density | pH | TCT | PCT |
|---|---|---|---|---|
| DPA | 15 ppg | 3.44 | <−30° F. | <0° F. |
| DPB | 14.8 ppg | 3.18 | −15° F. | 6° F. |

To fully assess the properties of the two formulations, the rheology of the resulting wellbore fluids was measured using a Fann 35 Viscometer with modified (0.2×) spring at the rpm indicated. Each of the wellbore fluids was hot rolled overnight at 150° F. The rheology properties at different temperatures of the two samples DPA and DPB are presented below in Tables 2 and 3. According to experimental findings, the viscosity of 14.2 ppg $CaBr_2$ is about 7 cP which indicates a flat Newtonian behavior. As seen from Table 2, the formulations exhibit a flat, near Newtonian behavior, and the viscosities of the samples are less than 30 cP.

TABLE 2

Rheology of DPA and DPB at different temperatures

| DPA Viscosity (cP) | Room temperature | 120° F. | 40° F. | DPB Viscosity (cP) | Room temperature | 120° F. | 40° F. |
|---|---|---|---|---|---|---|---|
| 600 rpm | 25.0 | 14.0 | 39.5 | 600 rpm | 11.2 | 6.2 | 16.5 |
| 300 rpm | 26.4 | 14.2 | 38.0 | 300 rpm | 11.4 | 6.2 | 16.8 |
| 100 rpm | 27.0 | 14.4 | 40.2 | 100 rpm | 11.4 | 6.6 | 18.0 |
| 6 rpm | 30.0 | 20.0 | 40.0 | 6 rpm | 20.0 | 10.0 | 20.0 |

The filtration tests were conducted by using a Buchner funnel and regular vacuum. The experimental data is summarized in Table 3. The densities of DPA and DPB after filtration were tested and were found to remain the same as the original samples.

TABLE 3

Filtration test results

| | DPA | DPB | $CaBr_2$ (14.2 ppg) | Tap water |
|---|---|---|---|---|
| Volume of sample (mL) | 100 | 100 | 250 | 250 |
| Times (s) | 70.1 | 29.91 | 49.88 | 26.91 |
| Rate (mL/s) | 1.43 | 3.34 | 5.01 | 9.29 |

To further demonstrate the performance of the wellbore fluids formulated in accordance with the teachings of the present disclosure, the thermal stability was evaluated by conducting the static aging of both DPA and DPB samples (after the filtration test) at 250° F. and 200 psi. After 5 days of static aging, a slight change of color was observed. However, no precipitation was observed in either of the brines. The rheology data of the aged samples, measured with a Fann 35 Viscometer at room temperature, is shown below in Table 4.

TABLE 4

Rheology of DPA and DPB after 5 days of static aging at 250° F.

| Rheology (r.t.) | DPA (x0.2) | DPB (x0.2) |
|---|---|---|
| 600 rpm | 230 | 104 |
| 300 rpm | 117 | 53 |
| 200 rpm | 82 | 36 |
| 100 rpm | 41 | 18 |
| 6 rpm | 3 | 2 |
| 3 rpm | 230 | 1 |

Compatibility tests of DPA and DPB with other brines, such as $CaBr_2$, $CaCl_2$, NaCl, NaBr, zinc calcium bromide and synthetic sea water were conducted by mixing and heat aging the sample at 150° F. for 24 hours. The compatibility tests were performed after 24 hours of static aging at 150° F. Solutions of pure brine, DPA and DPB, respectively, were used as control for comparison with other formulations. Table 5 presented below shows a summary of the compatibility test with DPA. As observed from Table 5, incompatibility (turbidity) is observed for formulations including NaCl, NaBr and seawater. However, no precipitates are observed. When the turbid fluid is filtrated using filter paper with 1 micron pore size, the filtration process is fast, with a minimal amount of solids remaining on the filter paper.

TABLE 5

Formulations and control samples used for compatibility tests

| No. | Formulations | Observations |
|---|---|---|
| 1 | 14.2 ppg CaBr$_2$/DPA/DPA 25 v %; DPA 50 v %; DPA 75 v % | DPA - semi transparent light blue<br>DPA 25, 50 and 75 v % - decreasingly translucent light blue |
| 2 | 11.6 ppg CaCl$_2$/DPA/DPA 25 v %; DPA 50 v %; DPA 75 v % | DPA - transparent light blue<br>DPA 25, 50 and 75 v %- decreasingly translucent with whitish yellow or light yellow hue. Transparency increases with DPA concentration |
| 3 | 10.0 ppg NaCl/DPA/DPA 25 v %; DPA 50 v %; DPA 75 v % | DPA - transparent dark blue<br>DPA 25 v % - completely translucent white<br>DPA 50 v % - mostly translucent white<br>DPA 75 v % - partially translucent white<br>Translucency decreases with increasing DPA concentration. |
| 4 | 12.5 ppg NaBr/DPA/DPA 25 v %; DPA 50 v %; DPA 75 v % | DPA - transparent dark blue<br>DPA 25 v % - completely translucent white<br>DPA 50 v % - mostly translucent white<br>DPA 75 v % - minimally translucent white<br>Translucency decreases with increasing DPA concentration. |
| 5 | 19.2 ppg ZnCaBr/DPA/DPA 25 v %; DPA 50 v %; DPA 75 v % | DPA - transparent dark blue<br>DPA 25 v % - completely translucent white<br>DPA 50 v % - mostly translucent white<br>DPA 75 v % - partially translucent whitish-blue<br>Translucency decreases with increasing DPA concentration. |
| 6 | synthetic sea water/DPA/DPA 25 v %; DPA 50 v %; DPA 75 v % | DPA - transparent dark blue<br>DPA 25 v % - completely translucent white<br>DPA 50 v % - mostly translucent white<br>DPA 75 v % - minimally translucent white<br>Translucency decreases with increasing DPA concentration. |

Compatibility tests of DPA and DPB with crude oil (XDM A-D) at 150° F. were conducted. Both brines showed good compatibility with the testing oil. The break rate was 100% emulsion separation after 5 minutes with sharp interphase and good wettability. A summary of the used formulations is shown below in Table 6.

TABLE 6

Emulsion Tests of DPA, DPB, and reference brines

| Sample | 50 v % DPA: 50 v % oil | 50 v % DPB: 50 v % oil | 50 v % CaBr$_2$ (14.2 ppg): 50 v % oil | 50 v % CaBr$_2$ (14.6 ppg): 50 v % oil | 50 v % CaBr$_2$ (15 ppg): 50 v % oil |
|---|---|---|---|---|---|
| 5 minutes | 100% | 100% | 100% | 100% | 100% |

Corrosion tests were performed by heat aging for 5 days using a C4130 carbon steel coupon immersed in the two formulations at 200° F. A summary of the experimental data is shown in Table 7.

TABLE 7

Corrosion tests results

| Fluid | Coupon no. | Initial weight (g) | Final weight (g) | Initial pH | Final pH | % of weight loss | Corrosion rate (mpy) |
|---|---|---|---|---|---|---|---|
| 14.2 ppg CaBr$_2$ | 31 | 13.4847 | 13.4568 | 5.20 | 6.05 | 0.21 | 4.87 |
| DPA | 21 | 13.1819 | 13.1570 | 3.44 | 3.17 | 0.19 | 4.04 |
| DPB | 22 | 13.3410 | 13.3141 | 3.13 | 3.26 | 0.20 | 4.35 |

To further demonstrate the role of the polyvinylpyrrolidone as a crystallization temperature agent, the polymer was added to 14.4-15.1 ppg CaBr$_2$, in the attempt to reduce the TCT below 20° F. Experimental data obtained for various polymer concentrations are presented in Table 8, below. As seen from Table 8, the effect of the polymeric crystallization agent on reducing TCT decreases as the brine density increases. Furthermore, the addition of the crystallization agent does not increase the brine viscosity. Additionally, the fluids maintained a Newtonian type rheology as the highest viscosity at room temperature was less than 20 cP.

TABLE 8

Formulations used in order to reduce the TCT

| | | K-12 | | K-15 | | K-30 | |
|---|---|---|---|---|---|---|---|
| TCT (° F.) | Blank | 1 wt % | 2 wt % | 1 wt % | 2 wt % | 1 wt % | 2 wt % |
| CaBr$_2$ 14.4 ppg | 15 | 4.8 | | | | | |
| CaBr$_2$ 14.6 ppg | 30 | 28.2 | 26.9 | 27.3 | 25.3 | 28.5 | 29.4 |
| CaBr$_2$ 15.0 ppg | 58 | 56.9 | 55.0 | 55.5 | 55.2 | 56.9 | 56.2 |

Embodiments of the present disclosure provide wellbore fluids and methods for completing a wellbore with such fluids that include an aqueous base fluid, such as a halide or a formate brine and colloidal particles such as nanoparticles, where the nanoparticles act as densification agents, increasing the density of the wellbore fluid. The wellbore fluid may optionally include polyvinylpyrrolidone as a crystallization temperature agent. The brines used for the formulation of wellbore fluids as described herein, have good stability and low crystallization temperature. Another aspect of the present disclosure is that the wellbore fluids as described herein have low corrosive effects upon metals such as iron, steel (including carbon steel) and other ferrous metals which typically come into contact with the brines during wellbore operations. In addition, the disclosed wellbore fluids have a low potential for formation damage. For example, the wellbore fluids as described herein do not form an emulsion with crude oils and do not precipitate with formation fluids. Furthermore, the wellbore fluids of the present disclosure may provide reduced environmental risks, as they can replace zinc containing brines for offshore and land drilling and completion activity.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed:

1. A method for completing a wellbore, the method comprising:
    pumping a wellbore fluid into the wellbore, the wellbore fluid comprising:
        an aqueous base fluid comprising a brine;
        a plurality of nanoparticles suspended in the aqueous base fluid, wherein the nanoparticles are present in the wellbore fluid in an amount of 30 wt % to 60 wt % of the total weight of the wellbore fluid;
        polyvinylpyrrolidone in an amount of 0.5 to 1.5 v % of the total weight of the wellbore fluid to lower a true crystallization temperature of the wellbore fluid;
        a polymer viscosifier; and
        bridging solid particles having an average size greater than or equal to about 1 µm; and
    performing at least one completion operation while the wellbore fluid is in the wellbore.

2. The method of claim 1, wherein the nanoparticles are selected from the group of silica, iron carbonate, iron oxide, titanium oxide, tungsten oxide, zirconium oxide, and zirconium silicate.

3. The method of claim 2, wherein the silica nanoparticles are selected from the group of colloidal silica nanoparticles and nano-sized precipitated silica.

4. The method of claim 1, wherein the aqueous base fluid is selected from the group of alkali metal halides, alkaline earth metal halides, and alkali metal formates.

5. The method of claim 1, wherein the wellbore fluid has a viscosity ranging from about 5 cP to about 150 cP at room temperature.

6. The method of claim 1, wherein the wellbore fluid has a turbidity ranging from about 10 to about 300 nephelometric turbidity units.

7. The method of claim 1, further comprising:
    mixing the plurality of nanoparticles with the brine at a pH ranging from about 2 to about 10 with the formation of a premix fluid; and
    removing water from the premix fluid to form the wellbore fluid with a desired density.

8. The method of claim 7, wherein removing water is performed by mixing the premix fluid with dry salts with the formation of the wellbore fluid with a desired density.

9. The method of claim 1, wherein the wellbore fluid has a density in the range of about 11 ppg to about 18 ppg.

10. The method of claim 1, wherein pumping a wellbore fluid into the wellbore comprises pumping a wellbore fluid exhibiting a viscosity less than 20 cP at room temperature into the wellbore.

11. The method of claim 1, wherein pumping a wellbore fluid into the wellbore comprises pumping a wellbore fluid comprising coated nanoparticles into the wellbore.

12. The method of claim 1, wherein pumping a wellbore fluid into the wellbore comprises pumping a wellbore fluid comprising silica nanoparticles coated with hydrous oxides or silane into the wellbore.

13. The method of claim 1, wherein pumping a wellbore fluid into the wellbore comprises pumping a wellbore fluid comprising silica nanoparticles coated with alumina into the wellbore.

14. The method of claim 1, wherein pumping a wellbore fluid into the wellbore comprises pumping a wellbore fluid comprising silica nanoparticles coated with silane into the wellbore.

15. The method of claim 1, wherein pumping a wellbore fluid into the wellbore comprises pumping a wellbore fluid comprising nanoparticles of iron carbonate, tungsten oxide, zirconium oxide, or zirconium silicate into the wellbore.

16. The method of claim 1, wherein pumping a wellbore fluid into the wellbore comprises pumping a wellbore fluid comprising silica nanoparticles including sodium ions bonded to a silica matrix of the silica nanoparticles into the wellbore.

17. A method comprising: introducing a wellbore fluid into a wellbore, wherein the wellbore fluid has a turbidity ranging from about 10 to about 300 nephelometric turbidity units, the wellbore fluid comprising:
    polyvinylpyrrolidone in an amount of 0.5 to 1.5 v % of the total weight of the wellbore fluid;
    an aqueous base fluid comprising a brine; and
    a plurality of nanoparticles suspended in the aqueous base fluid, wherein the nanoparticles are selected from the group of silica, iron carbonate, iron oxide, titanium oxide, tungsten oxide, zirconium oxide, zirconium silicate; wherein the nanoparticles are present in the wellbore fluid in an amount of 30 wt. % to 60 wt. % of the total weight of the wellbore fluid,
    wherein the wellbore fluid is a Newtonian fluid and exhibits a viscosity less than 20 cP at room temperature.

* * * * *